United States Patent [19]
Koutsky

[11] 4,092,009
[45] May 30, 1978

[54] HEIGHT ADJUSTER FOR A VEHICLE SEAT

[75] Inventor: L. John Koutsky, Milan, Ill.

[73] Assignee: Sears Manufacturing Company, Davenport, Iowa

[21] Appl. No.: 778,018

[22] Filed: Mar. 16, 1977

[51] Int. Cl.² ............................................. A47C 1/02
[52] U.S. Cl. .................................... 248/421; 297/345
[58] Field of Search ...................... 248/419, 421, 423; 297/345, 346

[56] References Cited
U.S. PATENT DOCUMENTS

| 2,859,063 | 11/1958 | Underland | 297/348 X |
| 3,355,211 | 11/1967 | Kolle | 297/346 X |
| 3,368,840 | 2/1968 | Dangauthier | 248/420 X |
| 3,460,793 | 8/1969 | Posh | 248/421 X |
| 3,473,776 | 10/1969 | Costin | 248/421 X |

Primary Examiner—James C. Mitchell
Attorney, Agent, or Firm—Henderson, Strom, Sturm, Cepican & Fix

[57] ABSTRACT

A vehicle seat having a seat assembly and a height adjuster for altering the displacement of the seat assembly from the vehicle. The vehicle seat includes a support assembly which connects the seat assembly to the vehicle. The support assembly includes a plurality of pivoting members which bear the seat assembly. The height adjuster includes a biasing member which operates the pivoting members to elevate the seat assembly. The height adjuster also includes structure for selectively locking the pivoting members against movement, whereby elevation of the seat assembly is arrested.

8 Claims, 6 Drawing Figures

HEIGHT ADJUSTER FOR A VEHICLE SEAT

BACKGROUND OF THE INVENTION

This invention relates to vehicle seats and adjustment mechanisms therefor. More particularly, this invention relates to height adjustment mechanisms for vehicle seats.

Vehicle seats currently may employ a number of adjustment mechanisms to adapt the seat to a particular person. Where the seat has a suspension system, a weight adjustment mechanism is often provided to adjust the suspension system such that, when the particular person is seated, the seat is disposed at the midpoint of the suspension travel. A fore-aft adjustment mechanism is often provided to move the seat longitudinally with respect to the vehicle to accommodate people of different sizes. Height adjustment mechanisms adapt a seat to people of different sizes by altering the vertical displacement of the seat from the vehicle.

Height adjustment mechanisms typically are operated by grasping a knob-like structure and rotating. A screw or threaded bolt, coupled to the knob, engages the remaining structure of the height adjuster to cause the seat to be moved in a vertical direction. The procedure for adjusting the height of the seat, then, requires a significant effort on the part of the person using the seat and is time-consuming.

SUMMARY OF THE INVENTION

A vehicle seat includes a seat assembly and a support assembly. The seat assembly further includes an upright back portion and a horizontally disposed seat portion. The seat portion is affixed to pivoting linkage members of the support assembly. The support assembly is affixed to the vehicle. The height adjustment mechanism includes upwardly biasing structures and locking structures. The biasing structures are affixed to the support assembly and act to pivot the linkage members such that the seat assembly is moved upwardly. The locking structures include a link affixed to certain of the linkage members, which link is selectively engageable to lock the linkage members against movement, thereby arresting vertical movement of the seat assembly.

It is an object of this invention to provide a height adjustment mechanism for a vehicle seat employing a unique structure which is economical to construct and maintain.

Also an object of this invention is to provide for a vehicle seat a height adjustment mechanism which resists fouling and therefore remains easy to operate.

A further object of this invention is to provide a height adjustment mechanism for a vehicle seat which permits rapid change, with minumum effort on the part of the operator, of the vertical displacement of the seat portion of the vehicle seat with respect to the vehicle.

Another object of this invention is to provide for a vehicle seat a height adjustment mechanism the structure and movements of which take up little vertical space, thereby conserving areas beneath the vehicle seat, and elsewhere in the vehicle, for other desirable and useful structures.

Still another object of this invention is to provide for a vehicle seat a height adjustment mechanism which renders the seat stronger and safer while remaining capable of attaining the aforementioned objects.

These objects and other features and advantages of the vehicle seat with height adjuster of this invention will become readily apparent upon referring to the following description when taken in conjunction with the appended drawing.

BRIEF DESCRIPTION OF THE DRAWING

The vehicle seat with height adjuster of this invention is illustrated in the drawing wherein.

DESCRIPTION OF THE PREFERRED EMBODIMENT

Figure 1:
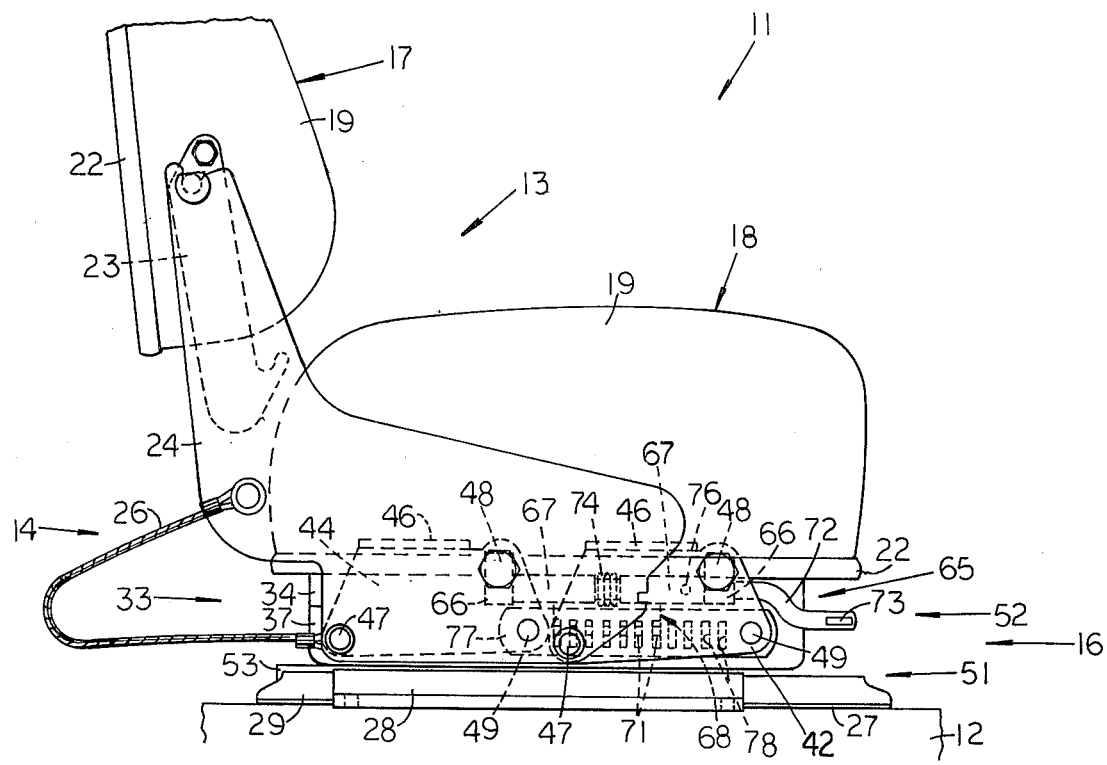
FIG. 1 is a fragmentary, side elevational view showing the seat assembly disposed in the bottom position of vertical adjustment.
Figure 2:
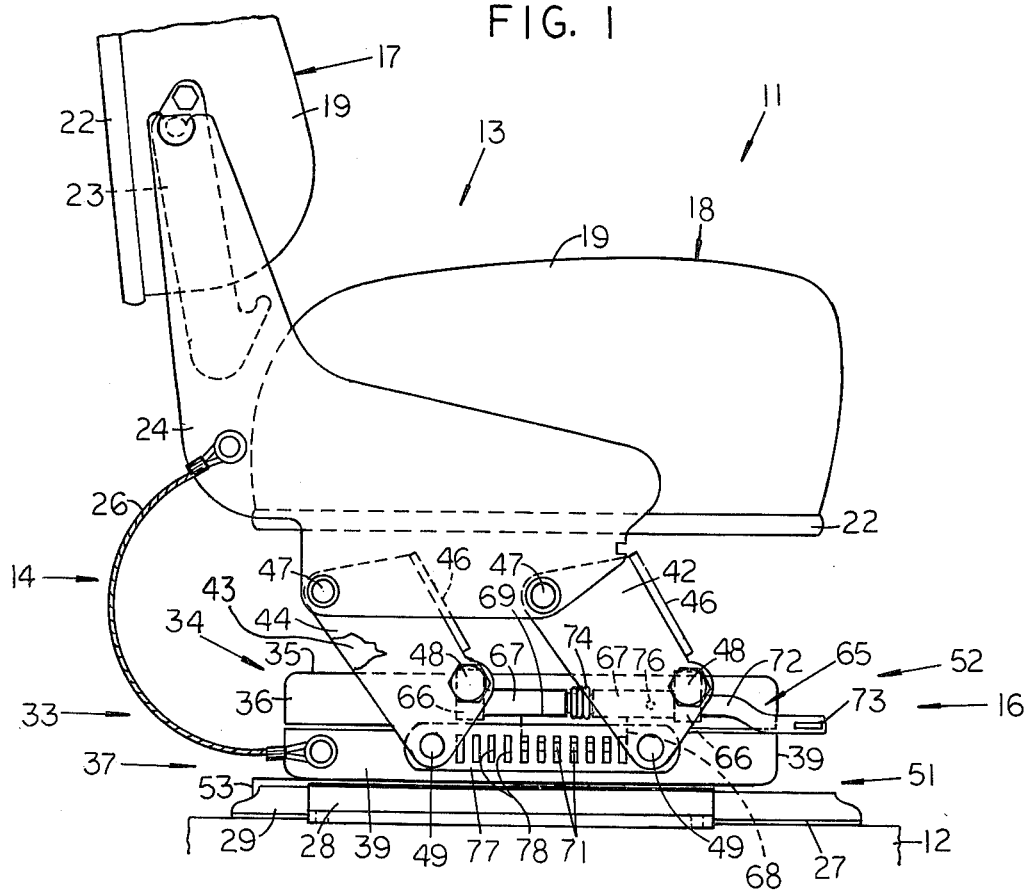
FIG. 2 is a fragmentary, side elevational view showing the seat assembly disposed in the top position of vertical adjustment.

The vehicle seat with height adjuster of this invention is shown generally at 11 in FIGS. 1 and 2 in attachment with a vehicle 12. The vehicle seat 11 more particularly includes a seat assembly 13, a support assembly 14 and an adjustment assembly 16. The support assembly 14 interconnects the seat assembly 13 and vehicle 12. The components of the adjustment assembly 16 are disposed upon or within the support assembly 14.

Figure 5:
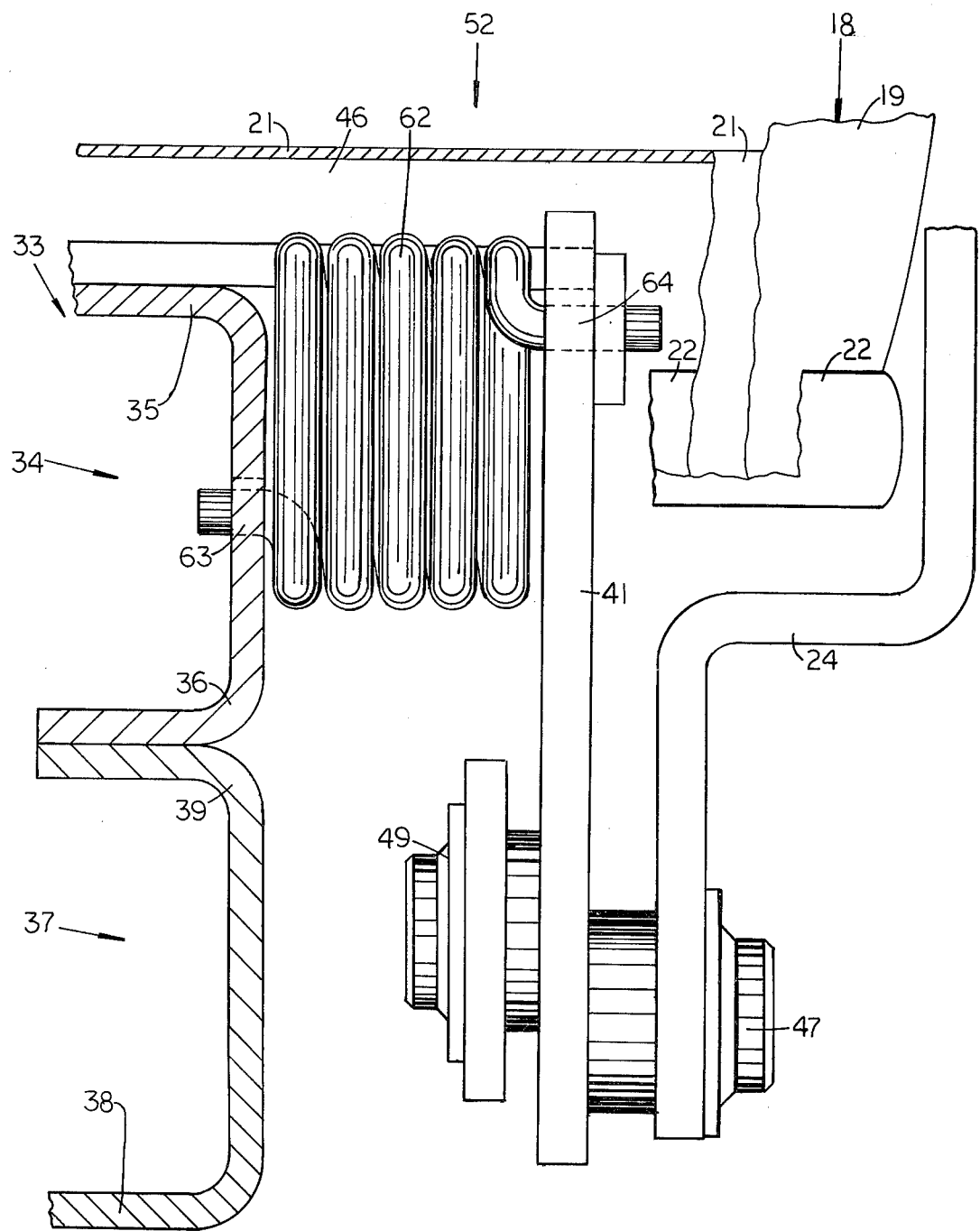
FIG. 5 is an enlarged, fragmentary, front elevational view illustrating biasing structure of the height adjuster, the seat assembly being disposed in the bottom position of vertical adjustment.

The seat assembly 13, as shown in FIGS. 1, 2 and 5, includes backrest and seat portions 17, 18. The portions 17, 18 include cushions (not shown) which have covers 19 stretched thereover and which are supported by pans 21. Extrusions 22 affix the covers 19 to the pans 21 about the peripheries thereof. Upper plates 23 are shown affixed to both sides of the backrest portion 17. Brackets 24 are attached to each side of the support assembly 14 and connect the backrest 17 to the seat 18, the plates 23 and brackets 24 forming a pivot attachment for the backrest 17. Each bracket 24 has one end of a tether cable 26 affixed thereto, the cable 26 then extending downwardly therefrom.

The support assembly 14, shown in FIGS. 1, 2, 4 and 5, includes a bottom plate 27 affixed to the vehicle 12. A pair of side rails 28 are affixed to the vehicle 12, each rail 28 being L-shaped in cross section. The rails 28 are disposed on each side of the plate 27, with the upright portions thereof disposed toward each other and in alignment with the longitudinal axis of the seat 11. A pair of guide rails 29 are affixed to the plate 27, each guide rail 29 being disposed adjacent to, and parallel with, a rail 28. Each guide rail 29, when viewed in cross section, includes a C-shaped portion 31, disposed next to, but opening away from, the adjacent rail 28. Each guide rail 29 also, again when viewed in cross section, includes an S-shaped portion 32, contiguous with the portion 31 and disposed away from the adjacent rail 28.

The support assembly 14 also includes a housing 33. The upper member 34 of the housing 33 includes an upper plate 35 attached to the underside of the pan 21 of the seat portion 18. Front, rear and side flanges 36 depend from the edges of the upper plate 35. The lower member 37 of the housing 33 includes a bottom plate 38. Front, rear and side flanges 39 extend upwardly from the edges of the plate 38. The upper and lower members 34, 37 are joined together at their respective flanges 36, 39. The tether cables 26 are affixed at their lower ends to the side flanges 39.

Right and left front linkage members 41, 42 and right and left rear linkage members 43, 44 are included in the support assembly 14 and form a parallelogram linkage structure. Cross-linking plates 46 are employed to join the two front members 41, 42 together and the two rear members 43, 44 together. Each member 41, 42, 43 and 44, as viewed in FIG. 2, is pivotally attached at an upper, rearward point 47 to a side bracket 24 and at a lower, forward point 48 to a side flange 36 of the upper member 34. Each member 41, 42, 43, 44, again as viewed in FIG. 2, has a lower, rearward third attachment point 49. Both the left linkage members 42, 44 and the right linkage members 41, 43 are disposed in, and pivot within, parallel planes which are aligned with the longitudinal axis of the seat 11.

The support assembly 14 may also include suspension structures, such as springs, and motion dampening means such as standard shock absorbers. These structures have been omitted from the drawing such that the invention herein might be more clearly illustrated.

The adjustment assembly 16, where the vehicle seat 11 includes suspension structures, commonly includes a weight adjustment mechanism (not shown), the purpose of which mechanism is to adjust the suspension such that seat assembly 13 rests at the midpoint of the suspension travel range when the operator is seated. The assembly 16 also includes a fore-aft adjustment mechanism 51, shown in FIG. 4. The mechanism 51 includes a pair of elongated rails 53, S-shaped in cross section and affixed to the bottom plate 38. The rails 53 are slidably received within the C-shaped portions 31 of the guide rails 29. The mechanism 51 also includes a latch structure 54 having a pair of latches 56 pivotally affixed to the bottom plate 38. A lever 57 is coupled to the forward, or exterior, end of one of the latches 56, and a diagonal bar 58 interconnects the two latches 56. Latch teeth 59 are disposed at the rearward, or interior, ends of the latches 56, and notches 61 are formed in the S-shaped portions 32 of the guide rails 29 for receiving the latch teeth 59.

Figure 3:
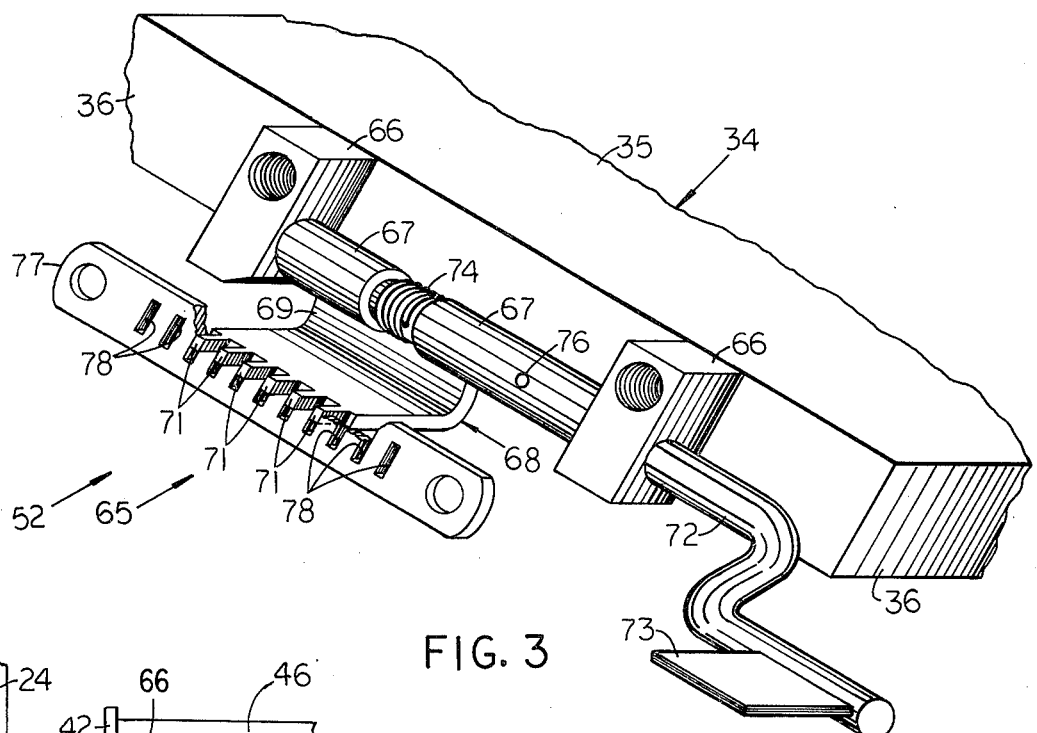
FIG. 3 is an enlarged, fragmentary, perspective detail view of the height adjuster portion of the adjustment assembly.

The adjustment assembly 16 also includes a height adjustment mechanism 52 shown most clearly in FIGS. 3 and 5. The mechanism 52 includes for biasing structures a torsion spring 62 for each right said linkage member 41 and 43. One end of each torsion spring 62 is affixed, as at 63, to the right side flange 36 of the upper housing member 34. The other end of each torsion spring 62 is affixed, as at 64, to a linkage member 41, 43. The springs 62 encircle the connecting bolt structures 48 (not shown in FIG. 5) of the right linkage members 41, 43. The mechanism 52 also includes a locking structure 65 which employs mounting blocks 66 affixed to the left side flange 36 of the upper housing member 34. The mounting blocks 66 are positioned to receive the attachment bolts 48 of the left linkage members 42, 44. Sleeve members 67 are both rotatably received at one end by a mounting block 66 and are joined at their opposite ends by a latch member 68. The latch member 68 is substantially L-shaped when viewed from the end, having a first portion 69 joining the sleeves 67 and a second portion comprised of a plurality of teeth 71 affixed normal to portion 69. A shaft member 72 is received through the mounting blocks 66 and sleeves 67. The shaft 72 bears at its forward, projecting end a lever 73 and, intermediate its ends is encircled by a torsion return spring 74. The spring 74 is at one end affixed to the left side flange 36 and at the opposite end affixed to the shaft 72. The shaft 72 also bears drive pins 76 which engage the sleeves 67. A flat, elongated link 77 is affixed between the third attachment points 49 of the left linkage members 42, 44. The longitudinal axis of the link 77 is substantially horizontally disposed, and a plurality of parallel, vertically disposed transverse slots 78 are formed through the link 77.

Figure 6:
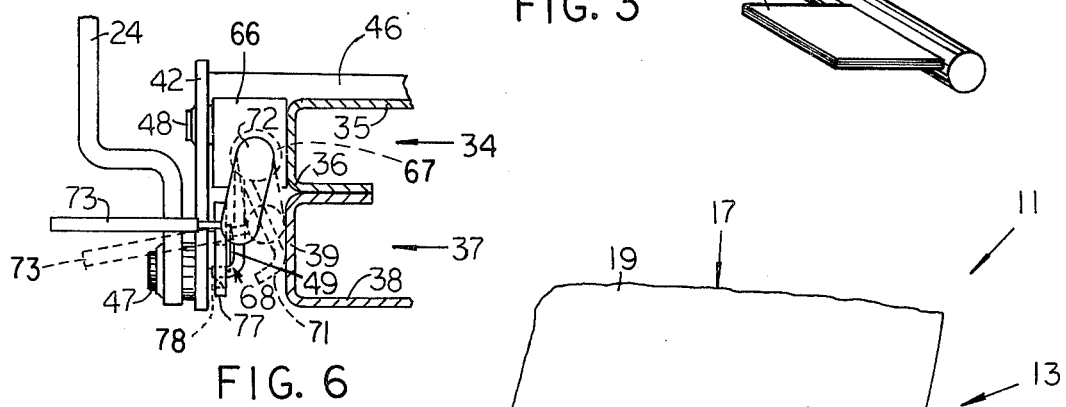
FIG. 6 is an enlarged, fragmentary, front elevational view illustrating movement of elements of the height adjuster.
Figure 4:
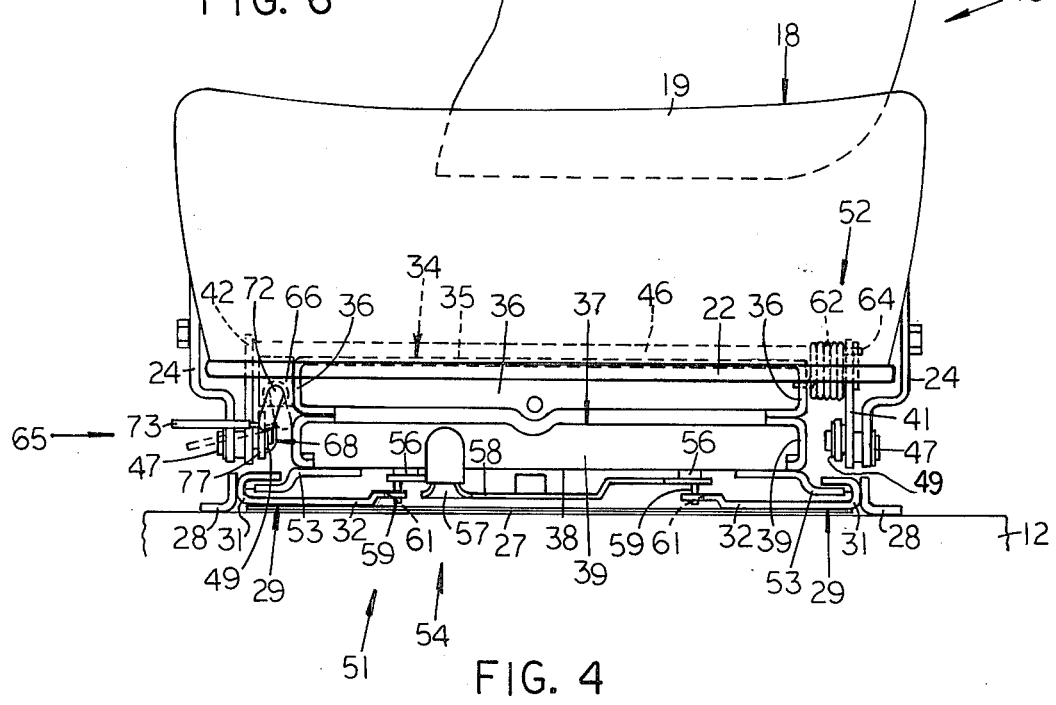
FIG. 4 is a fragmentary, front elevational view of the vehicle seat with height adjuster.

FIGS. 1, 2 and 6 illustrate the operation of the vehicle seat 11 and particularly the height adjustment mechanism 52. FIG. 1 illustrates the vehicle seat 11 with the seat assembly 13 disposed in the bottom position, closest to the vehicle 12. FIG. 2 shows the vehicle seat 11 with the seat assembly 13 disposed at the top position, the maximum vertical displacement from the vehicle 12. Movement of the seat assembly 13 between the positions of FIGS. 1 and 2 is accomplished by pivotal motion of the linkage members 41, 42, 43, 44 about their main support points 48. The seat assembly 13 remains level because of the pivotal attachments at 47. Motion of the linkage members 41, 42, 43, 44 is downward and toward the rear of the vehicle seat 11, as the position of FIG. 1 is approached, and upward and toward the front as the position of FIG. 2 is approached.

The torsion springs 62 of the height adjustment mechanism 52 bias the right linkage members 41, 43 and, through the cross plates 46, the left linkage members 42, 44 upward and forward. Upward motion of the seat assembly 13 toward the position of FIG. 2 is accomplished by allowing the torsion springs 62 to act upon the linkage members 41, 42, 43, 44. Body weight of the vehicle operator readily counters the action of the springs 62, and downward motion of the seat assembly 13 toward the position of FIG. 1 is accomplished by the operator's disposing himself upon the seat portion 18. When the height of the seat assembly 13 has been adjusted to suit the particular vehicle operator, the linkage members 41, 42, 43, 44 are locked against further motion.

The height adjustment mechanism 52 employs the locking structure 65 to arrest the motion of the linkage members 41, 42, 43, 44. When the teeth 71 of the latch member 68 engage the notches 78 of the link 77, the link 77, and therefore the left linkage members 42, 44 and also, through the cross plates 46, the right linkage members 41, 43, are locked against movement. Disengagement of the teeth 71 from the notches 78 allows the seat assembly 13 to be moved again.

Movement of the locking structure 65 is best illustrated in FIG. 6. The lever 73 is grasped by the vehicle operator and pushed downward. This effects a counterclockwise (as viewed from the front) rotation of the shaft 72 about its longitudinal axis. Drive pins 76 cause the sleeves 67 to similarly rotate, and the sleeves 67 carry the latch member 68 such that the teeth 71 are pivoted away from, and out of engagement with, the notches 78 of the link 77. Since the link 77 is free to move, the seat assembly 13 may be adjusted in the manner aforementioned. When the seat assembly 13 has been finally adjusted for height, the vehicle operator releases pressure upon the lever 73. The return spring 74 then causes the shaft 72, and therefore the sleeves 67 and latch member 68, to rotate back such that the teeth 71 are again engaging the notches 78. The seat assembly 13 is then secured against movement from the adjusted height.

The operation of the height adjustment mechanism 52 and the manner of altering the elevation of the seat assembly 13 rely upon pivotal or rotational, rather than slide movements. Fouling of the mechanism 52 is therefore minimized, and height adjustment of the seat assembly 13 remains smooth. Since the torsion springs 62 automatically move the seat assembly 13 upwardly when allowed to do so, and since the weight of the vehicle operator readily causes the seat assembly to move downwardly, again when allowed to do so, height adjustment of the vehicle seat 11 is accomplished rapidly and with a minimum amount of effort on the part of the operator. The torsion springs 62 and locking structure 65 of the height adjustment mechanism 52 are compact in vertical dimension. The link 77 motions are almost completely forward and backward, and the vertical dimension of the locking structure 65 is only slightly increased when the teeth 71 are disengaged from the notches 78. This conservation of space due to the design and movement of the mechanism 52 results in areas beneath the vehicle seat 11 and elsewhere, as within the cab of the vehicle, being preserved for other desirable and useful structures. The vehicle seat 11 is also a safer seat in that the link 77 and plurality of teeth 71 provides a strong locking, rendering the seat assembly 13 secure against collapsing under such stresses as a sudden, strong pull upon the seat belt (not shown) of the seat 11.

By varying the number of notches 78 in the link 77, the height adjustment mechanism 52 may determine the vertical disposition of the seat assembly 13 with varying degrees of fineness. By decreasing the width, and increasing the number, of the notches 78 in the link 77, greater fineness of adjustment is obtained. The width of the teeth 71 are correspondingly modified. Strength against strong pulls is retained by increasing the number of teeth 71 where the widths of the notches 78 and teeth 71 have been reduced. Further strengthening may be attained by disposing an additional locking structure on the right side flange 36 of the upper housing member 34 and between the attachment points 49 of the right side linkage members 41, 43. Such a locking structure would be a mirror image of that shown at 65, although instead of having a lever it could be operated by suitable structure (not shown) coupled to lever 73.

A different biasing structure may be used instead of the torsion springs 62. An extension spring (not shown) may be attached between the rear of the right side flange 36 of the housing member 34 and the attachment point 49 of the right front linkage member 41. In cases where a very simple and light seat is employed, the height adjustment mechanism 52 may be modified such that biasing structures are not present, the seat, because of its lightness, being easily moved by the operator but being locked against movement as previously described.

Although a preferred embodiment and modifications thereof have been disclosed herein, it is to be remembered that various modifications and alternate constructions can be made thereto without departing from the full scope of the invention, as defined in the appended claims.

I claim:

1. A height adjuster for vehicle seats, the vehicle seat having a support assembly, affixed to the vehicle, and a seat assembly, said height adjuster comprising:
   support means for connecting the support assembly and the seat assembly, said support means being pivotally attached both to the support assembly and to the seat assembly;
   upwardly biasing torsion means for urging said support means to pivot upwardly from the support assembly thereby increasing the distance between the vehicle and the seat assembly, said upwardly biasing torsion means being affixed between the support assembly and said support means; and
   locking means including a linking member and a latching member, said linking member being attached to, and movable with, said support means, the longitudinal axis of, and movements of, said linking member being substantially in a horizontal plane, said linking member having a plurality of slots formed therethrough, said latching member being affixed to the support assembly and being movable to engage and hold said linking member against movement, whereby said support means is locked against movement thereby securing the seat assembly at a selected distance from the vehicle.

2. A height adjuster as described in claim 1 and further wherein said upwardly biasing torsion means includes a plurality of torsion springs.

3. A height adjuster as described in claim 1 and further wherein said support means includes a plurality of linkage members, each linkage member being at one end pivotally attached to the support assembly and at the opposite end pivotally attached to the seat assembly, each linkage member being attached to, and disposed on the opposite side of the support assembly from, another linkage member, said biasing torsion means including a plurality of torsion springs, each torsion spring being affixed at one end to the support assembly and at the opposite end to one of said linkage members.

4. A height adjuster as described in claim 2 and further wherein said latching member comprises:
   a latch, said latch having a plurality of teeth; and
   rotatable means affixed to the support assembly, said latch being affixed to said rotatable means, said teeth being made to engage, or disengage from, said slots upon operation of said rotatable means.

5. A height adjuster as described in claim 3 and and further wherein said linking member is attached between two of said linkage members, said latching member including a latch and a rotatable means, said latch having a plurality of teeth and being affixed to said rotatable means, said teeth being made to engage, or disengage from, some of said slots upon operation of said rotatable means.

6. An adjustment structure for a parallelogram linkage, the linkage including a plurality of linkage members, each linkage member at one end being attached to a support structure, each linkage member being attached to, and disposed on the opposite side of the support structure from, another linkage member, said adjustment structure comprising:
   a link movable with, and attached between, the linkage members, said link having a plurality of slots formed therethrough, the longitudinal axis of said link and movements of said link being in substantially the same plane;
   latching means including a latch, mounting blocks and a rotatable member, said mounting blocks being attached to one side of the support structure, the linkage members disposed on one side of the support structure being attached to said mounting blocks, said rotatable member extending between said mounting blocks, said latch having a plurality of teeth and being affixed to said rotatable member, said teeth being made to selectively engage some of said slots upon operation of said rotatable member; and a plurality of torsion springs, each torsion spring being affixed at one end to the support structure and at the opposite end to a linkage member.

7. A height adjuster as described in claim 4 and further wherein said rotatable means includes a pair of mounting blocks and a rotatable member, said mounting blocks being affixed to one side of the support assembly, said support means being pivotally attached to said mounting blocks, said rotatable member being rotatably supported by and extending between said mounting blocks, said latch being attached to said rotatable member and being disposed between said mounting blocks, said linking member abutting against said mounting blocks when the seat assembly is disposed a maximum distance from the vehicle.

8. A height adjuster as described in claim 5 and further wherein said linkage members are interconnected by a phasing plate means, said phasing plate means being disposed flat against the support assembly when the seat assembly is disposed a minimum distance from the vehicle.

* * * * *